Oct. 27, 1959     W. F. STREHLOW     2,909,928
PRESSURE GAUGE
Filed Jan. 18, 1954

Inventor
Walter F. Strehlow
by
Attorney

United States Patent Office 2,909,928
Patented Oct. 27, 1959

2,909,928

PRESSURE GAUGE

Walter F. Strehlow, Wauwatosa, Wis., assignor to Allis-Chalmers Manufacturing Company, Milwaukee, Wis.

Application January 18, 1954, Serial No. 404,693

1 Claim. (Cl. 73—406)

This invention relates to a pressure gauge, particularly of the type which is adapted to withstand relatively high pressures.

The principal object of the invention is to provide a pressure gauge of an improved construction which will be capable of accurately indicating pressures over a low pressure range in addition to being capable of withstanding surges of much higher pressures without damage.

With the development of automatic draft regulating apparatus using hydraulic lift mechanisms for tractor implements, it has become increasingly important for operators of tractors to know the extent of the effective weight transfer which has taken place by operation of the hydraulic lift mechanism. When a lifting force is applied by the lift mechanism to the implement borne by the tractor, the supporting force exerted by the ground on the implement is decreased causing an increase in the weight supported by the traction wheels of the tractor with an increase in wheel traction because of the effective weight transfer. Proper operation of the automatic draft regulating apparatus requires that the operator know the extent of this weight transfer, and a pressure gauge installed in the hydraulic lines of the lift mechanism supplies this information. These hydraulic lift mechanisms are usually equipped with relief valves to prevent excessively large pressures from being built up in the hydraulic lines; however, momentary surges of high pressures still occur in the hydraulic lines due to the time interval between a pressure surge and the moment the relief valve opens sufficiently to reduce the pressure appreciably. These momentary surges of high pressure, which may be as high as 10,000 p.s.i., make it necessary that a gauge be utilized in the hydraulic lines capable of withstanding over a considerable period of time the high pressures resulting from such pressure surges. However, the gauge as an indicating device useful to the tractor operator must also be accurate at much lower pressures, as the hydraulic lift mechanism for optimum operation is usually operated with between 0 and 500 p.s.i. pressure in the hydraulic lines.

Accordingly, it is a more specific object of this invention to provide an improved indicating device for measuring the weight transfer resulting from operation of a hydraulic lift mechanism of the type described.

Another object of this invention is to provide a pressure gauge having the characteristics set forth, which is simple in construction, efficient in operation and which lends itself to manufacture at relatively low cost.

Still another object of this invention is to provide a pressure gauge which becomes increasingly resistant to leakage of the pressure fluid as the pressure is increased.

Still another object of this invention is to provide a pressure gauge of the above outlined character which will be reasonably accurate over a relatively wide pressure range.

Other objects and novel features of this invention will become apparent as the following specification is read in conjunction with the accompanying drawing wherein.

Figure 1:
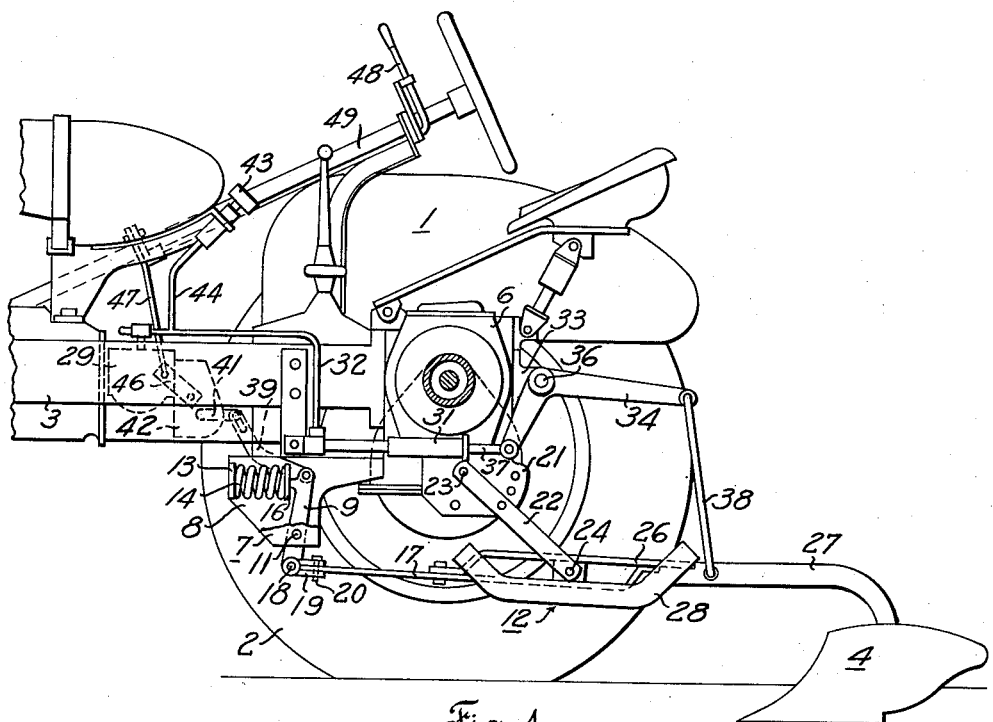
Fig. 1 is a side elevation of the rear portion of a tractor and attached pickup plow, the near tractor rear wheel being removed to more clearly show the apparatus involved.

Referring to Fig. 1, it will be seen that the apparatus chosen to illustrate the present invention comprises generally a tractor 1 having a pair of traction wheels 2 and a frame 3, and a pickup plow 4 which is connected with the tractor for up and down adjustment between operative and inoperative positions.

More specifically, mounted forward of and below the rear axle housing 6 of the tractor is a drawbar support 7 adapted for connecting implements to the tractor in draft transmitting relation therewith. Drawbar support 7 comprises a pair of laterally spaced plate members 8 and a bifurcated draft regulating lever 9 supported for swinging movement between these plate members about pin 11. The lower portion of lever 9 supports and is connected to the forward end of drawbar structure 12. The upper portion of lever 9 is acted upon by a biasing structure comprising a spring seat 13 rigidly fixed between upper forward portions of plate members 8, a compression spring 14 positioned on the seat, and a plate member 16 attached to the opposite end of the spring and bearing rearwardly against forwardly projecting portions of lever 9.

Drawbar structure 12 comprises a draft tongue 17 carried for vertical and horizontal swinging movement relative to lever 9 by pins 18 and 20 and clevis 19. The structure for guiding the swinging movement of the drawbar comprises a pair of vertical plate members 21 fixed to the under portion of rear axle housing 6 in depending laterally spaced and generally parallel relation with respect to each other, a pair of strap members 22 having their upper ends pivotally mounted on axially aligned pins 23 carried by plate members 21, a transverse guide bar 24 positioned between and carried by the lower end portions of strap members 22 for rotation on a transverse axis, and a guide strap 26 fixed to the rear part of draft tongue 17 in overlying vertically spaced parallel relation therewith. Guide bar 24 and guide strap 26 coact to afford guided movement of drawbar structure 12 in both a horizontal and vertical direction. A plow bottom and beam assembly 27 are operatively connected to drawbar structure 12 by means of bar member 28.

For lifting and lowering the implement there is provided a power lift mechanism comprising generally a pumping means shown herein as a hydraulic pump 29 operatively connected to the tractor power source in any suitable manner, a hydraulic motor 31 receiving liquid from pump 29 through conduit 32, and a hydraulic motor actuated lift mechanism operatively interconnecting hydraulic motor 31 and plow 4. The lift mechanism includes a bracket structure 33 fixed to and extending rearwardly from rear axle housing 6, and a bell crank lever 34 pivotally connected with bracket structure 33 by pin 36, one arm of this lever being pivotally connected to piston rod 37 of motor 31 and the other arm being linked to plow bottom and beam assembly 27 by lift rod 38.

It will be seen that the draft regulating lever 9 which is movable in response to a change in draft load imposed on drawbar structure 12 is connected with hydraulic pump 29 through a link 39 having a pivotal connection with the upper end portion of lever 9 and a lost motion connection (pin and slot) with an arm 41 extending from a pump control housing 42. The construction and operation of hydraulic pump unit 29 and the controls relating thereto are disclosed in U.S. patents to Walter F. Strehlow et al., 2,611,319 and 2,611,306 and it is therefore believed that a further discussion of the automatic draft regulating apparatus is unnecessary for a complete understanding of this invention. The operating connections between the plow or implement 4 and the hydraulic pump 29 are such that a change in draft load on the implement will be transmitted through lever 9 and link 39 to control the rate of delivery of liquid from pump 29 to hydraulic motor 31.

A pressure gauge 43 receives fluid from hydraulic motor conduit 32 through a branch conduit 44. A manual control comprising a lever arm 46, a link 47 and a hand lever 48 carried by the tractor steering column 49 permits the operator to control the operation of the draft regulating apparatus with reference to the information received from gauge 43.

Figures 2, 3:
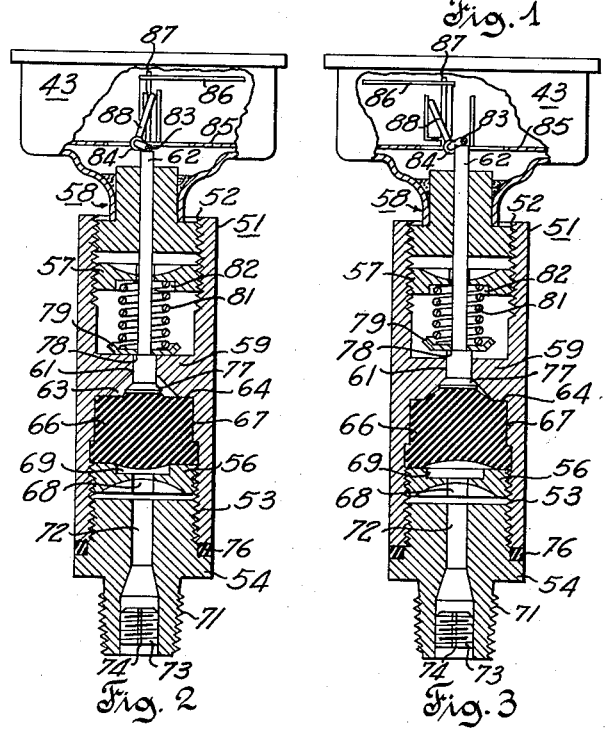
Fig. 2 is a side elevation, partly in section, of a pressure gauge forming part of the apparatus shown in Fig. 1, parts of the gauge being shown in a condition in which they appear when no pressure is applied to the gauge.
Fig. 3 is a side elevation similar to Fig. 2, parts of the gauge in Fig. 3 being shown in a condition in which they appear when pressure is applied to the gauge.

Referring now to the construction of the pressure gauge as shown in Figs. 2 and 3, a generally cylindrical housing portion 51 is internally threaded at 52 and 53 for the reception of a nipple 54, plug screw 56, spring screw 57, and indicator assembly 58.

Housing portion 51 is provided with a radial inner wall 59 containing an axial or second passage 61 adapted to receive a plunger 62. A tapered second region 63 in axial alignment with and leading into the passage 61 is provided in the wall 59 and the outer edge of the second region 63 is spaced from the inner cylindrical surface of the housing portion 51 to form a shoulder 64 which serves as a seat for a resilient plug 66.

Resilient plug 66 is composed of rubber or similar resilient material capable of returning to its original shape after deformation under stress, and is positioned within housing portion 51 by means of threaded plug screw 56. The space within the housing portion 51 occupied by the resilient plug 66 is bounded at one end by the wall presented by the plug screw 56, and at the other end by shoulder 64. Plug screw 56 and shoulder 64 form, with the housing 51, a hollow rigid walled body 67. A longitudinal or first passageway 68 merging with an axially extending cylindrical first region 69 is located in plug screw 56 to allow admission of pressure fluid to plug 66, first region 69 providing a wide area of contact between pressure fluid and the resilient plug. In the condition of the parts shown in Fig. 2, plug 66 substantially fills hollow body 67 covering the ends of first and second regions 69 and 63 adjacent hollow body 67.

Threaded nipple 54 is received by housing portion 51 and is provided with reduced threaded portion 71 for connection to branch conduit 44 of the hydraulic pressure fluid system. An internal axial passage 72 of the nipple 54 is threaded to receive a filler screw 73 containing a restricted passage 74. Gasket 76 disposed between nipple 54 and housing portion 51 seals this section of the housing assembly against leakage of pressure fluid.

Plunger 62 slidably mounted in the housing is formed at its lower end with outwardly extending upwardly tapering flange 77 which conforms with the taper of the walls of region 63 so that when plug 66 is fully extruded, as shown in Fig. 3, the tapered surface of flange 77 and of the region 63 contact each other and prevent further upward movement of the plunger within the housing portion 51. A cupped washer 79 is seated on a shoulder 78 formed on plunger 62 above tapered flange 77 to form a seat for a spring 81 encircling the stem of plunger 62.

Externally threaded spring screw 57 is received by housing portion 51 and contains an upwardly extending recess 82 for positioning spring 81 within the housing. Spring 81 is a compression spring and bears upon washer 79 on plunger 62 to resiliently oppose upward movement of the plunger from the position in which it is shown in Fig. 2, spring screw 57 providing means for adjusting the compression of spring 81.

The stem of plunger 62 extends upwardly through spring screw 57 and is surrounded at its upper end by an indicator assembly 58. The upper end of plunger 62 presents a horizontal end face in contact with a crank shaft 83 which is journaled in brackets 84 on a supporting plate 85.

Figure 4:
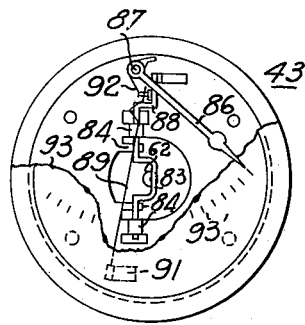
Fig. 4 is a top view of the pressure gauge shown in Figs. 2 and 3, part of the dial being broken away for purposes of exposure.

An indicator needle 86 of the gauge is mounted on the supporting plate 85 for pivotal movement about a vertical axis generally indicated in Figs. 2, 3 and 4 by the reference character 87. A suitable mechanism of conventional construction, which is generally indicated by the reference character 88 in Figs. 2, 3 and 4, is operatively interposed between the crank shaft 83 and the indicator needle 86 for moving the latter from the zero position in which it is shown in Figs. 2 and 4 toward the left in Fig. 4 upon upward movement of the plunger 62 from the position in which the latter is shown in Fig. 2. A hair spring 89 shown in Fig. 4 is anchored at one end in a bracket 91 on the supporting plate 85, and bears at its other end against an arm 92 of the indicator needle 86 so as to urge the latter toward the zero position in which the needle is shown in Fig. 4. A dial 93 bearing suitable graduations 93' is mounted in fixed position on the supporting plate 85 under the indicator needle 86, so that the adjusted position of the latter may readily be correlated to the graduations of the dial.

In utilizing draft regulating apparatus of the type described, the tractor operator normally positions the manual control lever so that under the ground working conditions he is encountering, the lift mechanism is operating to impart a small lifting force on implement 4 and pressure liquid is present in the lines of the hydraulic system. An increase in draft load results in an increase in the amount of pressure liquid pumped to hydraulic motor 31, with an increased lifting force applied by the lift mechanism to implement 4. Such increase of lifting force results in a transfer of part of the weight of the implement to the traction wheels. The pressures normally present in the lines under ordinary conditions range from 0 to 500 p.s.i. A relief valve is normally installed in the hydraulic lift mechanism to prevent excessively high pressures from occurring in the hydraulic lines; however, momentary surges of high pressures do occur because of the time interval required for the relief valve to operate. These surges of high pressure can be borne by applicant's pressure gauge over a considerable period of time, as explained below.

Referring to Figs. 2 and 3, in operation of the hydraulic system the constriction 74 serves to dampen rapid oscillations of pressure to which the system might become subjected. Pressure fluid is admitted to region 69 through passage 68 and constriction 74 and bears against resilient plug 66. Plug screw 56 has been tightened to prevent leakage into the indicator assembly at low pressures and to firmly position resilient plug 66 within the housing. When pressure enters region 69, resilient plug 66 will respond and tend to be extruded to a varying extent into region 63, the extent of extrusion for a given pressure depending on the composition of the plug and the resistance offered by spring 81. Applying pressure against resilient plug 66 tightens the pressure fluid seal between the plug and the housing portion and, by extrusion of resilient plug 66, moves plunger 62 upwardly against the pressure of spring 81. Movement of the plunger results in a corresponding movement of indicator needle 86. By using a rubber plug and spring member as described, a simply constructed sturdy gauge of considerable range can be achieved.

If extremely high pressure surges occur in the hydraulic lines, plug 66 will be extruded in response to the high pressure until further extrusion is prevented by reason of engagement of the wall of region 63 by flange 77. When this point has been reached, the pressure gauge is indicating the maximum pressure it is capable of measuring, region 63 and flange 77 serving to guard resilient plug 66 from rupture by restraining the resilient plug from further extrusion.

The graduations 93' of the dial 93 may be marked to indicate existing pressure conditions in the hydraulic system in pounds per square inch or in pounds of transferred implement weight, or in any other desired manner.

While I have shown and described the present invention with reference to a hydraulic lift mechanism mounted on a tractor, and have shown and described a particular embodiment of my invention, it should be understood that it is not intended to limit the invention to the exact construction or combination described, as changes in construction and design which come within the scope of the appended claim may occur to those skilled in the art.

It is claimed and desired to secure by Letters Patent:

A fluid pressure gauge comprising: a hollow rigid walled body completely filled with a resilient plug except in first and second regions, each region bounded by an outer surface portion of said resilient plug and an inner surface portion of the rigid wall of said body, the inner surface portion of said second region being tapered; a shoulder formed by the wall of said body and engaging said plug in fluid sealing relation, said shoulder holding said plug against bodily movement into said second region; first and second passages through the wall of said body at each of said inner surface portions, said first passage permitting pressure fluid to be applied in the first of said regions, said second passage containing a plunger having one end extending into said second region in contact with said plug, said one end of said plunger having a tapered flange thereon for engagement with the tapered surface of said second region to limit the movement of said plunger and the amount of extrusion of said plug due to excessive fluid pressure in said first region; and indicator means connected to the other end of said plunger to determine the extent of movement of said plunger as affected by the extrusion of said plug.

References Cited in the file of this patent

UNITED STATES PATENTS

| | | |
|---|---|---|
| 1,143,338 | Wesener | June 15, 1915 |
| 1,994,388 | Erichsen | Mar. 12, 1935 |
| 2,260,636 | Neff | Oct. 28, 1941 |
| 2,369,650 | Allen | Feb. 20, 1945 |
| 2,627,183 | Greenwood et al. | Feb. 3, 1953 |

FOREIGN PATENTS

| | | |
|---|---|---|
| 1,004,147 | France | Nov. 28, 1951 |